US010764306B2

(12) United States Patent
Lam et al.

(10) Patent No.: US 10,764,306 B2
(45) Date of Patent: Sep. 1, 2020

(54) DISTRIBUTING CLOUD-COMPUTING PLATFORM CONTENT TO ENTERPRISE THREAT DETECTION SYSTEMS

(71) Applicant: SAP SE, Walldorf (DE)

(72) Inventors: Thanh-Phong Lam, Heidelberg (DE); Jens Baumgart, Dossenheim (DE); Florian Kraemer, Dielheim (DE); Volker Guzman, Heidelberg (DE); Anne Jacobi, Wiesloch (DE); Kathrin Nos, Nussloch (DE); Jona Hassforther, Heidelberg (DE); Omar-Alexander Al-Hujaj, Bad Schönborn (DE); Stefan Rossmanith, Walldorf (DE); Thorsten Menke, Bad Iburg (DE)

(73) Assignee: SAP SE, Walldorf (DE)

( * ) Notice: Subject to any disclaimer, the term of this patent is extended or adjusted under 35 U.S.C. 154(b) by 115 days.

(21) Appl. No.: 15/383,771

(22) Filed: Dec. 19, 2016

(65) Prior Publication Data

US 2018/0176235 A1    Jun. 21, 2018

(51) Int. Cl.
*H04L 29/06* (2006.01)

(52) U.S. Cl.
CPC ...... *H04L 63/1416* (2013.01); *H04L 63/1425* (2013.01); *H04L 63/1433* (2013.01)

(58) Field of Classification Search
CPC . H04L 63/1416; H04L 63/1425; H04L 63/14; H04L 63/1408; G06F 21/50
See application file for complete search history.

(56) References Cited

U.S. PATENT DOCUMENTS

| | | | |
|---|---|---|---|
| 5,440,726 | A | 8/1995 | Fuchs |
| 5,960,170 | A | 9/1999 | Chen |
| 6,173,418 | B1 | 1/2001 | Fujino et al. |
| 6,629,106 | B1 | 9/2003 | Narayanaswamy |
| 6,779,001 | B1 | 8/2004 | Kanai et al. |
| 7,376,969 | B1 | 5/2008 | Njemanze |
| 7,380,205 | B2 | 5/2008 | Bezrukov et al. |
| 7,441,197 | B2 | 10/2008 | Tschiegg et al. |
| 7,457,792 | B2 | 11/2008 | Weigt et al. |
| 7,457,793 | B2 | 11/2008 | Weigt et al. |
| 7,457,794 | B2 | 11/2008 | Weigt et al. |
| 7,545,969 | B2 | 6/2009 | Bennett |
| 7,624,092 | B2 | 11/2009 | Lieske et al. |
| 7,627,544 | B2 | 12/2009 | Chkodrov |
| 7,756,808 | B2 | 7/2010 | Weigt et al. |

(Continued)

OTHER PUBLICATIONS

Office Action in related U.S. Appl. No. 15/216,201 dated Mar. 7, 2018; 14 pages.

(Continued)

*Primary Examiner* — Joseph P Hirl
*Assistant Examiner* — Ka Shan Choy
(74) *Attorney, Agent, or Firm* — Fish & Richardson P.C.

(57) ABSTRACT

A Content Service executing in a cloud-computing-based Cloud Platform receives enterprise threat detection (ETD) Content transmitted from an ETD Content Development System (CDS) as a publication of the ETD Content from the ETD CDS. The received ETD Content is stored into a Content Management System (CMS). A determination is made of a registered Client ETD System for which the ETD Content is relevant. The ETD Content is published to the registered Client ETD System.

20 Claims, 3 Drawing Sheets

(56) References Cited

U.S. PATENT DOCUMENTS

| | | |
|---|---|---|
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 | 5/2018 | Fuhrman |
| 10,001,389 B1 | 6/2018 | Das et al. |
| 10,079,842 B1 | 9/2018 | Brandwine et al. |
| 10,102,379 B1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1* | 6/2003 | Moriconi ............ G02B 6/132 726/1 |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0106847 A1 | 5/2006 | Eckardt et al. |
| 2006/0161816 A1* | 7/2006 | Gula ............... H04L 41/065 714/39 |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1* | 6/2007 | Miller ............... G06F 21/10 709/226 |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1* | 12/2009 | Chaudhry ............ G06F 21/552 |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1* | 6/2012 | Kim ................ H04L 63/1408 726/1 |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1* | 10/2012 | Lappas ............... G06Q 10/00 706/52 |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |

(56) References Cited

U.S. PATENT DOCUMENTS

| | | | |
|---|---|---|---|
| 2016/0366174 A1* | 12/2016 | Chernin | H04L 29/06965 |
| 2016/0373476 A1 | 12/2016 | Dell'anno et al. | |
| 2016/0378978 A1 | 12/2016 | Singla | |
| 2016/0381049 A1 | 12/2016 | Lakhani | |
| 2017/0004005 A1 | 1/2017 | Elliott | |
| 2017/0026400 A1 | 1/2017 | Adams et al. | |
| 2017/0031002 A1 | 2/2017 | Newton et al. | |
| 2017/0034023 A1 | 2/2017 | Nickolov | |
| 2017/0070415 A1 | 3/2017 | Bell et al. | |
| 2017/0091008 A1 | 3/2017 | Cherbakov | |
| 2017/0093902 A1 | 3/2017 | Roundy et al. | |
| 2017/0148060 A1 | 5/2017 | Showers | |
| 2017/0169217 A1 | 6/2017 | Rahaman | |
| 2017/0251365 A1 | 8/2017 | Burchard | |
| 2017/0270006 A1 | 9/2017 | Kankylas | |
| 2017/0279837 A1 | 9/2017 | Dasgupta | |
| 2017/0287179 A1 | 10/2017 | Tibshirani et al. | |
| 2017/0302685 A1 | 10/2017 | Ladnai et al. | |
| 2017/0308602 A1 | 10/2017 | Raghunathan et al. | |
| 2017/0316026 A1 | 11/2017 | Kanthak et al. | |
| 2017/0322993 A1 | 11/2017 | Brodt et al. | |
| 2017/0324766 A1 | 11/2017 | Gonzalez | |
| 2018/0027002 A1 | 1/2018 | Rodeck et al. | |
| 2018/0027010 A1 | 1/2018 | Pritzkau et al. | |
| 2018/0059876 A1 | 3/2018 | Peng et al. | |
| 2018/0063167 A1 | 3/2018 | Rodeck | |
| 2018/0091535 A1 | 3/2018 | Chrosziel | |
| 2018/0091536 A1 | 3/2018 | Chrosziel et al. | |
| 2018/0157835 A1 | 6/2018 | Nos | |
| 2018/0173872 A1 | 6/2018 | Lam et al. | |
| 2018/0173873 A1 | 6/2018 | Hassforther et al. | |
| 2018/0176234 A1 | 6/2018 | Kunz et al. | |
| 2018/0176238 A1 | 6/2018 | Nos et al. | |
| 2018/0234447 A1 | 8/2018 | Mueen | |
| 2019/0005423 A1 | 1/2019 | Pritzkau et al. | |
| 2019/0007435 A1 | 1/2019 | Pritzkau et al. | |

OTHER PUBLICATIONS

Office Action in related U.S. Appl. No. 15/274,569 dated Apr. 16, 2018; 11 pages.
Office Action in related U.S. Appl. No. 15/246,053 dated May 21, 2018; 14 pages.
Office Action in related U.S. Appl. No. 15/380,379 dated Jul. 19, 2018; 9 pages.
Office Action in related U.S. Appl. No. 15/274,693 dated Jul. 26, 2018; 14 pages.
Final Office Action issued in U.S. Appl. No. 15/274,693 dated Feb. 11, 2019, 19 pages.
Final Office Action issued in U.S. Appl. No. 15/370,084 dated Feb. 4, 2019, 16 pages.
Non-Final Office Action issued in U.S. Appl. No. 15/274,569 dated Mar. 22, 2019, 11 pages.
Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.
U.S. Office Action in related U.S. Appl. No. 15/370,084 dated Aug. 27, 2018, 14 pages.
U.S. Office Action in related U.S. Appl. No. 15/216,201 dated Jul. 20, 2018, 15 pages.
U.S. Office Action in related U.S. Appl. No. 15/246,053 dated Sep. 24, 2018, 14 pages.
U.S. Office Action in related U.S. Appl. No. 15/253,438 dated Sep. 19, 2018, 17 pages.
U.S. Office Action in related U.S. Appl. No. 15/274,569 dated Nov. 14, 2018, 10 pages.
U.S. Office Action in related U.S. Appl. No. 15/380,450 dated Aug. 27, 2018, 19 pages.
U.S. Office Action in related U.S. Appl. No. 15/380,450 dated Jan. 23, 2019, 21 pages.
U.S. Office Action in related U.S. Appl. No. 15/380,450 dated Nov. 2, 2018, 19 pages.
U.S. Office Action in related U.S. Appl. No. 15/381,567 dated Nov. 2, 2018, 17 pages.
Final Office Action issued in U.S. Appl. No. 15/381,567 dated May 22, 2019, 28 pages.
Non-Final Office Action issued in U.S. Appl. No. 15/216,046 dated Apr. 29, 2019, 23 pages.
Non-Final Office Action issued in U.S. Appl. No. 15/246,053 dated May 17, 2019, 28 pages.
Office Action issued in U.S. Appl. No. 15/847,478, dated Aug. 6, 2019, 36 pages.
Office Action issued in U.S. Appl. No. 15/216,046 dated Aug. 21, 2019, 23 pages.
Non-Final Office Action issued in U.S. Appl. No. 15/639,863 dated Jun. 24, 2019, 37 pages.
Non-final office action issued in U.S. Appl. No. 15/381,567 dated Oct. 7, 2019, 17 pages.

* cited by examiner

FIG. 3

DISTRIBUTING CLOUD-COMPUTING PLATFORM CONTENT TO ENTERPRISE THREAT DETECTION SYSTEMS

BACKGROUND

Enterprise threat detection (ETD) typically collects and stores a large amount/large sets of log data associated with various heterogeneous systems (often referred to as "big data"). The collected log data is usually analyzed using forensic-type data analysis tools to identify suspicious behavior and to allow an appropriate response. However, ETD systems have typically not been fully compatible or efficiently integrated with cloud computing systems.

SUMMARY

The present disclosure describes methods and systems, including computer-implemented methods, computer program products, and computer systems for distributing cloud computing platform content to enterprise threat detection (ETD) systems.

In an implementation, a Content Service executing in a cloud-computing-based Cloud Platform receives enterprise threat detection (ETD) Content transmitted from an ETD Content Development System (CDS) as a publication of the ETD Content from the ETD CDS. The received ETD Content is stored into a Content Management System (CMS). A determination is made of a registered Client ETD System for which the ETD Content is relevant. The ETD Content is published to the registered Client ETD System.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, client administrators do not have to log into a service marketplace to discover where new ETD Security Notes and associated Content files have been published. Second, client administrators do not need to determine whether the published new ETD Security Notes and associated Content files are applicable to their information technology (IT) landscapes (including ETD systems). Third, new ETD Content can be automatically published to a cloud-computing-based Content Service. Fourth, Client ETD Systems can register for published ETD Content applicable to their Client ETD System. When new ETD Content applicable to their Client ETD System is published, the Content Service can publish the new ETD Content to the Client ETD System. The published new ETD Content can also be automatically integrated into the Client ETD System. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes distributing cloud computing platform content to enterprise threat detection (ETD) systems and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

ETD typically collects and stores a large amount/large sets of log data associated with various heterogeneous systems (often referred to as "big data"). The collected log data is usually analyzed using forensic-type data analysis tools to identify suspicious behavior and to allow an appropriate response. However, ETD systems have typically not been fully compatible or efficiently integrated with cloud computing systems.

For example, published ETD Security Notes (hereinafter "Security Notes") reveal discovered weaknesses in client information technology (IT) landscapes (including client ETD systems). The Security Notes are typically made available on a service marketplace (for example, SAP Service Marketplace), and it is each client's administrative responsibility to monitor the service marketplace and update their particular IT landscape based on information in the Security Notes.

Often, client IT landscapes are not updated within a reasonable time from publication of the Security Notes to mitigate or eliminate exposure to potential exploits revealed by the discovered security weaknesses. One primary reason is that it is often mandatory to disable an IT landscape server(s) to perform security updates, update software revisions, etc. The downtime reduces productiveness of the client IT landscapes, is often prohibited by business realities, and encourages clients to perform scheduled security updates/servicing as opposed to updating at a point-in-time when security weaknesses are discovered.

As a result, ETD systems currently provide a "virtual patching service" which provides updated ETD detection "patterns" (used to detect event anomalies in IT landscapes) contemporaneously with Security Notes that can be used by a client to detect possible malicious activities in their IT landscape until their particular IT landscape is updated to mitigate or eliminate the discovered security weaknesses. Clients receive the updated ETD Patterns and manually update their ETD systems to incorporate the updated ETD detection capabilities. If a security breach/exploit is discovered prior to a scheduled update of an IT landscape, mitigation actions can be taken at that time. The virtual patching service can be seen as a "shelter-in-place" strategy.

Using the virtual patching service provides clients an overlook of known security risks pertaining to the client IT landscape. Additionally, clients do not need to disable their IT landscape every time a security weakness is discovered, so client IT landscape productivity remains high. Clients can also determine, based on their unique business circumstances, cost effectiveness vs. risk with respect to scheduling implementation of ETD security updates for identified weak points in their IT landscape.

Currently, Security Notes and ETD Patterns are not available using cloud-computing platforms. Providing clients Security Notes and patterns using a secure cloud-computing platform can offer an ETD "pre-notify" service based on Security Notes and as an automatic adjustment service for ETD Patterns.

Described is a cloud-computing platform Content Service that delivers ETD Content applicable to a particular client IT landscape which can be consumed by an ETD system in the particular client IT landscape. The provided ETD Content typically contains Security Notes and Content Files. Content Files can include ETD Patterns or other content useful for ETD purposes, etc. The generated ETD Content is typically reprocessed (for example, into JSON or other file formats) for storage by Content Service into a data store and transfer by the Content Service from the data store to a Client ETD system. In typical implementations, a Client ETD System will only receive Security Notes and Content Files relevant for the client IT landscape. A Security Note and associated Content File is considered relevant if related corrections are not yet included in a particular version of systems/software (including the Client ETD System) associated with the client IT landscape.

Figure 1:
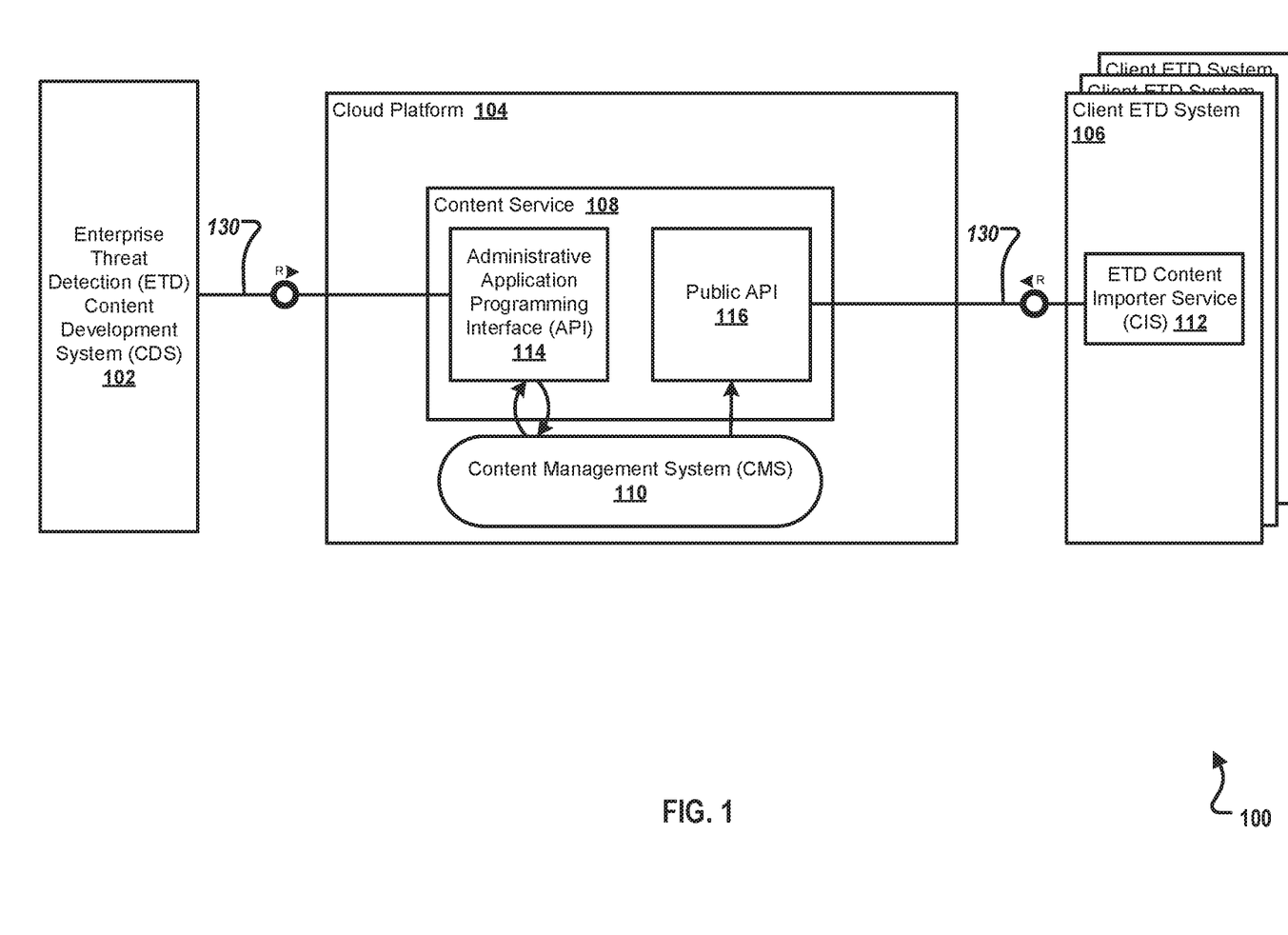
FIG. 1 is a block diagram illustrating an example distributed computing system (EDCS) for providing enterprise threat detection (ETD) content using a cloud-computing platform Content Service, according to an implementation.

FIG. 1 is a block diagram illustrating an example distributed computing system (EDCS) 100 for providing enterprise threat detection (ETD) content using a cloud-computing platform Content Service, according to an implementation. At a high-level, the EDCS 100 includes an ETD Content Development System (CDS) 102, cloud-computing-based Cloud Platform 104, and Client ETD System 106, connected using network 130. The Cloud Platform 104 contains a Content Service 108 and a Content Management System (CMS) 110. The Client ETD System 106 contains an ETD Content Importer Service (CIS) 112. Note that the different network 130 connections can each represent an independent network (for example, the ETD CDS 102 can be connect to the Cloud Platform 104 with a network that is independent of the network used to connect the Client ETD System 106 to the Cloud Platform 104.

In typical implementations, ETD Content is obtained by the ETD CDS 102 from databases (not illustrated) containing information related to discovered security weaknesses, threats, and the like. The ETD CDS 102 is configured to permit ETD Content to be developed, edited/updated, and published to the Content Service 108 executing on the Cloud Platform 104. Publication can include both push- and pull-type content delivery. In some implementations, saving/updating ETD Content on the ETD CDS 102 can trigger ETD Content synchronization (that is, automatic publication) of the ETD Content to the Content Service 108 or a notification (for example, send to an administrator of the ETD CDS 102) that the saved/updated ETD Content needs to be published to the Content Service 108. Content Synchronization can also occur from the Content Service 108 to the ETD CDS 102 if content is changed in the CMS 110. The ETD CDS 102 can be configured to provide tools for development, editing/updating, and publication of ETD Content (for example, using graphical user interface (GUI) tools).

The Content Service 108 contains an Administrative Application Programming Interface (API) 114 and a Public API 116. In typical implementations, the Administrative API 114 and Public API 116 can be implemented as representational state transfer (REST) APIs. Moreover, in typical implementations, the Content Service 108 is implemented as a REST service. The Administrative API 114 is configured to be secure (for example, accessible by users with particular defined roles such as "etd-admin" or other defined role) and is provided to permit secure transfer of ETD Content to the Content Service 108 for storage. The Public API 116 is provided to permit access and retrieval of the ETD Content for consumption by the Client ETD System 106. In typical implementations, the stored ETD Content is accessible using the Public API 116 without credentials. In some implementations, the Content Service 108 is coded in the JAVA programming language using JAX-RS JAVA APIs for RESTful Web services and the APACHE CXF Web services framework.

ETD Content from the ETD CDS 102 is stored in Content Management System (CMS) 110. In some implementations, the CMS 110 is based on the Content Management Interoperability Services (CMIS) interface protocol.

In typical implementations, a network 130 connection configured between the ETD CDS 102 and the Administrative API 114 is configured to be READ/WRITE, permitting administrators to manage ETD Content in the CMS 110 and Content Service 108 configuration. In typical implementations, a network 130 connection configured between the ETD CIS 112 and the Public API 116 is configured to be READ only, to preserve security related to the Content Service 108 and other connected components of the EDCS 100. In typical implementations, connections between the ETD CDS 102, ETD CIS 112, and the applicable APIs of the Content Platform 104 are configured to use the Hypertext Transfer Protocol/Secure (HTTPS) protocol.

In some implementations, the Content Service 108 can be used to update Client ETD Systems with updated ETD Patterns. For example, a relationship can be configured between new Security Notes and associated ETD Patterns. The ETD CIS 112 can register with the Content Service 108 through a request to receive new ETD Content). When new Security Notes and Content Files are written to the CMS 110 by the ETD CDS 102, the Content Service can determine which Client ETD System(s) the new Security Notes and associated ETD Patterns (as Content Files) are applicable to, and can publish the ETD Content to applicable ETD CIS 112*s*. In some implementations, the associated ETD Patterns can be automatically integrated into the Client ETD System 106. This described configuration would permit rapid dissemination and integration of new Security Notes and associated ETD Patterns to Client ETD Systems 106 to help perform automatic, proactive "virtual patching" of the Client ETD System 106. In effect, the Content Service 108 can act as a pre-notify service to update Client ETD Systems 106 with updated ETD Patterns prior to client awareness of the update.

As described above, the ETD CIS 112 is configured to read new ETC content from the Content Service 108 using the Public API 116. The ETD CIS 112 is configured as an extension of the Client ETD System 106 database (not illustrated). In typical implementations, the database is an in-memory database (such as SAP HANA). The ETD CIS 112 is configured to consume the Content Service 108. In some implementations, the ETD CIS 112 is written in JAVASCRIPT.

In typical implementations, ETD Content (Security Notes and Content Files) is reformatted by the ETD CDS 102 prior to transfer to the Content Service 108 (for example, as JSON files) and written to the CMS 110. Content Files can be "assigned" to Security Notes using various attributes. The Content Service 108 signs the ETD Content with an ETD private key of the ETD CDS 102. The receiving Client ETD System 106 validates the ETD private key signature with an ETD public key.

In some implementations, an example Content File (as an ETD Pattern) can resemble:

```
{
    "id" : "4711", // technical ID of the content file
    "version" : {
        "etdVersion" : "1.0",
        "etdSP" : 3,
        "etdPatchLevel" : 1,
        "version" : 5
    },
    "description" : "Unauthorized access to billing service"
    "noteNumbers" : [4711, 4712], // related notes.
    "items" : [{
        "id" : "A0A1" // technical ID of the pattern
        "objectType" : "Pattern",
        "objectName" : Unauthorized access to billing service
        "data" : <implementation code of the security pattern >
        "version" : "1.0",
        "replicationMode" : "manual" // customer is asked to
include object in ETD system
        ]
}.
```

As illustrated, the example Content File includes one item (here IDs "A0A1" that is linked to associated Security Notes through JSON attribute "noteNumbers": [4711, 4712]." Affected ETD version for the item is stored in the JSON attribute "version" (here "1.0" for item "A0A1"). Note that the above-described example Content File is provided for purposes of understanding and is not meant to limit the disclosure in any way. A Content File can contain other values and data consistent with this disclosure. The other values and data are also considered to be within the scope of this disclosure.

In some implementations, Security Notes can contain, among other things:
  A note number,
  A description—for example, which software components are affected by the note,
  information about SAP support packages containing the program corrections related to the note, and
  Information about affected objects—ETD uses this information to detect whether weaknesses on these objects are exploited.

Figure 2:
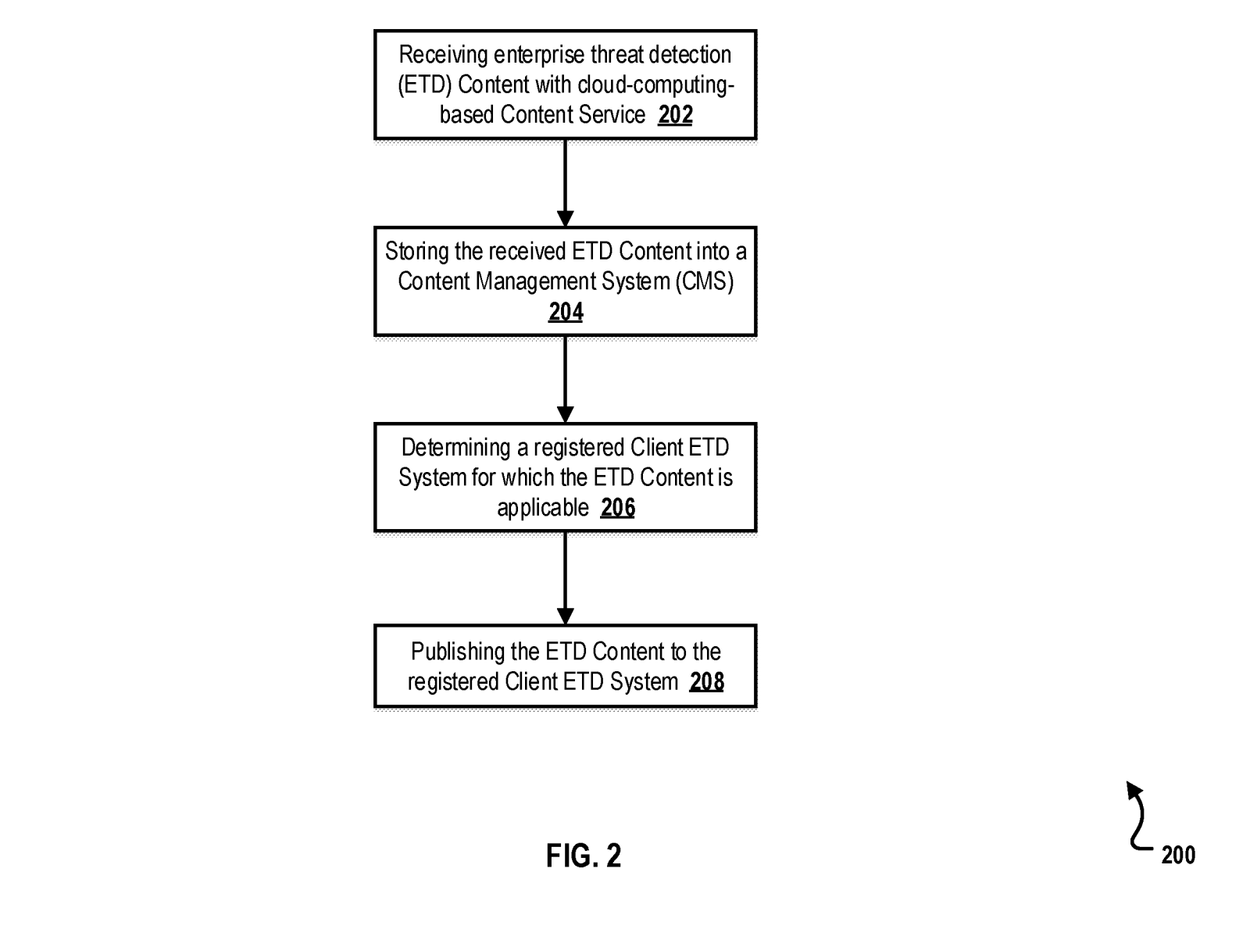
FIG. 2 is a flowchart illustrating an example method for providing ETD Content using a cloud-computing platform Content Service, according to an implementation.

FIG. 2 is a flowchart of an example method 200 for distributing cloud computing platform content to ETD systems, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, developed enterprise threat detection (ETD) Content is transmitted from an ETD Content Development System (CDS) as a publication of the ETD Content from the ETD CDS to a Content Service executing in a cloud-computing-based Cloud Platform. The received ETD Content includes Security Notes and Content Files. Content Files can include ETD Patterns or other content useful for ETD purposes. In typical implementations, the ETD Content is received by a Content Service secure administrative API. From 202, method 200 proceeds to 204.

At 204, the received ETD Content is stored into a Content Management System (CMS) executing in the Cloud Platform. In typical implementations, storing the received ETD Content includes reformatting the ETD Content for storage into the CMS. From 204, method 200 proceeds to 206.

At 206, a registered Client ETD System for which the ETD Content is applicable is determined. A registration is received for ETD Content from an ETD Client Import Service (CIS) executing on the Client ETD System. In typical implementations, the ETD CIS connects to the Content Service using a public API. From 206, method 200 proceeds to 208.

At 208, the ETD Content is published to the registered Client ETD System. In some implementation the published ETD Content received by the ETD CIS is integrated into the Client ETD System. In some implementations, the integration can be configured to be automatically performed. After 208, method 200 stops.

Figure 3:
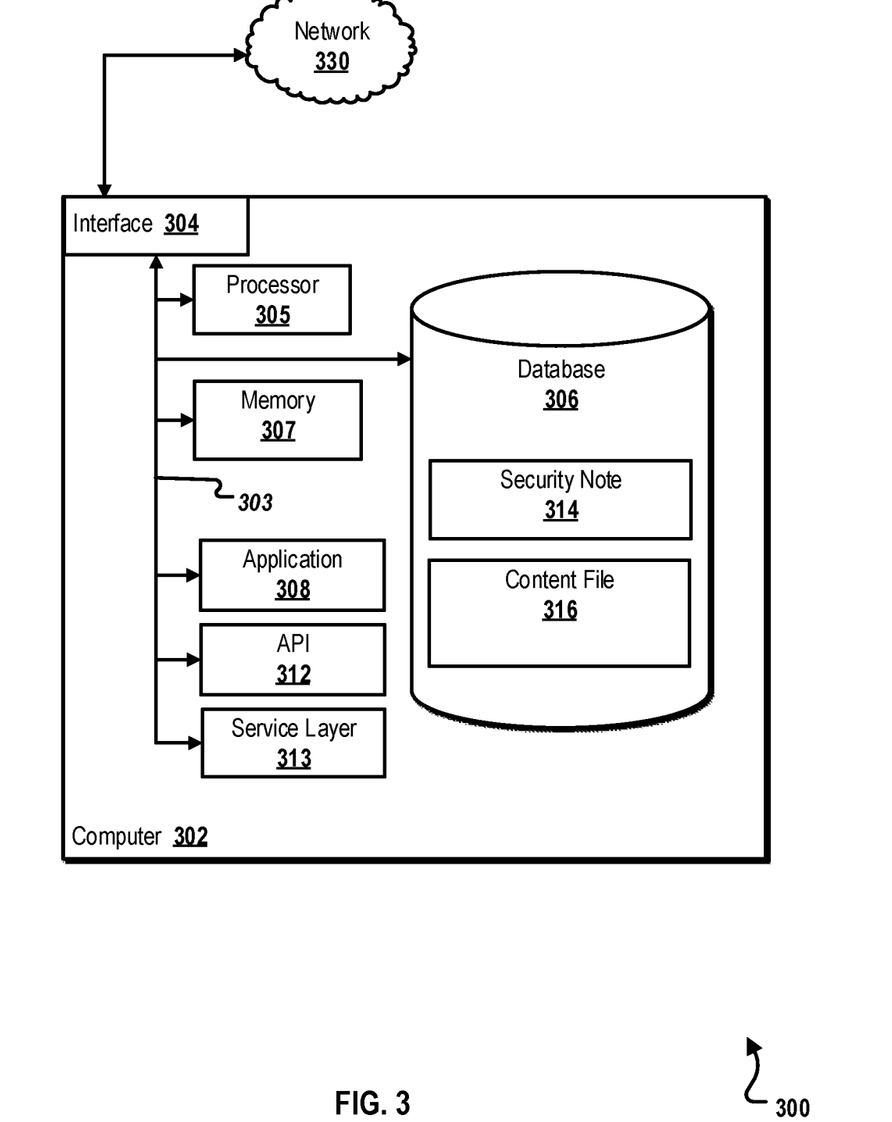
FIG. 3 is a block diagram illustrating an exemplary computer system used to provide computational functionalities associated with described algorithms, methods, functions, processes, flows, and procedures as described in the instant disclosure, according to an implementation.

FIG. 3 is a block diagram of an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds a Security Note 314 and a Content File 316 as described above.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications 308 on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method, comprising: receiving, with a Content Service executing in a cloud-computing-based Cloud Platform, enterprise threat detection (ETD) Content transmitted from an ETD Content Development System (CDS) as a publication of the ETD Content from the ETD CDS; comprising storing the received ETD Content into a Content Management System (CMS); determining a registered Client ETD System for which the ETD Content is relevant; and publishing the ETD Content to the registered Client ETD System.

The foregoing and other described implementations can each optionally include one or more of the following features:

A first feature, combinable with any of the following features, wherein the received ETD Content includes Security Notes and Content Files.

A second feature, combinable with any of the previous or following features, further comprising receiving the ETD Content using a Content Service secure administrative application programming interface (API).

A third feature, combinable with any of the previous or following features, wherein storing the received ETD Content includes reformatting the ETD Content for storage into the CMS.

A fourth feature, combinable with any of the previous or following features, further comprising receiving a registration for ETD Content from an ETD Client Import Service (CIS) executing on the Client ETD System.

A fifth feature, combinable with any of the previous or following features, wherein the ETD CIS connects to the Content Service using a public API.

A sixth feature, combinable with any of the previous or following features, further comprising integrating the received ETD Content into the Client ETD System.

In a second implementation, a non-transitory, computer-readable medium storing one or more instructions executable by a computer system to perform operations comprising: receiving, with a Content Service executing in a cloud-computing-based Cloud Platform, enterprise threat detection (ETD) Content transmitted from an ETD Content Development System (CDS) as a publication of the ETD Content from the ETD CDS; comprising storing the received ETD Content into a Content Management System (CMS); determining a registered Client ETD System for which the ETD Content is relevant; and publishing the ETD Content to the registered Client ETD System.

The foregoing and other described implementations can each optionally include one or more of the following features:

A first feature, combinable with any of the following features, wherein the received ETD Content includes Security Notes and Content Files.

A second feature, combinable with any of the previous or following features, further comprising one or more instructions to receive the ETD Content using a Content Service secure administrative application programming interface (API).

A third feature, combinable with any of the previous or following features, wherein storing the received ETD Content includes reformatting the ETD Content for storage into the CMS.

A fourth feature, combinable with any of the previous or following features, further comprising one or more instructions to receive a registration for ETD Content from an ETD Client Import Service (CIS) executing on the Client ETD System.

A fifth feature, combinable with any of the previous or following features, wherein the ETD CIS connects to the Content Service using a public API.

A sixth feature, combinable with any of the previous or following features, further comprising one or more instructions to integrate the received ETD Content into the Client ETD System.

In a third implementation, a computer-implemented system, comprising: a computer memory; and a hardware processor interoperably coupled with the computer memory and configured to perform operations comprising: receiving, with a Content Service executing in a cloud-computing-based Cloud Platform, enterprise threat detection (ETD) Content transmitted from an ETD Content Development System (CDS) as a publication of the ETD Content from the ETD CDS; comprising storing the received ETD Content into a Content Management System (CMS); determining a registered Client ETD System for which the ETD Content is relevant; and publishing the ETD Content to the registered Client ETD System.

The foregoing and other described implementations can each optionally include one or more of the following features:

A first feature, combinable with any of the following features, wherein the received ETD Content includes Security Notes and Content Files.

A second feature, combinable with any of the previous or following features, further configured to receive the ETD Content using a Content Service secure administrative application programming interface (API).

A third feature, combinable with any of the previous or following features, wherein storing the received ETD Content includes reformatting the ETD Content for storage into the CMS.

A fourth feature, combinable with any of the previous or following features, further configured to receive a registration for ETD Content from an ETD Client Import Service (CIS) executing on the Client ETD System.

A fifth feature, combinable with any of the previous or following features, wherein the ETD CIS connects to the Content Service using a public API.

A sixth feature, combinable with any of the previous or following features, further configured to integrate the received ETD Content into the Client ETD System.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, with a Content Service executing in a cloud-computing-based Cloud Platform, enterprise threat detection (ETD) Content transmitted from an ETD Content Development System (CDS) as a publication of the ETD Content from the ETD CDS, the ETD Content comprising Security Notes and Content Files that are assigned to the Security Notes and comprise an ETD Pattern;
   securely storing, using the Content Service, the received ETD Content into a Content Management System (CMS) interoperably coupled to the Content Service using a secure administrative application programming interface (API) and a non-credential-requiring public API;
   determining, using the Content Service, a registered Client ETD System for which the ETD Content is relevant;
   retrieving the ETD Content from the CMS using the non-credential-requiring public API;
   publishing, using the Content Service, the ETD Content to the registered Client ETD System; and
   detecting, using the ETD Pattern, malicious activities in the registered Client ETD System until the registered Client ETD System is updated to address security weaknesses associated with the malicious activities.

2. The computer-implemented method of claim 1, wherein the ETD Pattern is automatically integrated in the registered Client ETD System to perform automatic, proactive virtual patching.

3. The computer-implemented method of claim 1, further comprising receiving, with the Content Service, the ETD Content using the secure API.

4. The computer-implemented method of claim 1, wherein storing the received ETD Content includes reformatting the ETD Content for storage into the CMS.

5. The computer-implemented method of claim 1, further comprising receiving a registration for ETD Content from an ETD Client Import Service (CIS) executing on the Client ETD System, wherein the ETD CIS is an extension of a Client ETD System database.

6. The computer-implemented method of claim 5, wherein the ETD CIS connects to the Content Service using a public API.

7. The computer-implemented method of claim 1, further comprising integrating the received ETD Content into the Client ETD System.

8. A non-transitory, computer-readable medium storing one or more instructions executable by a computer system to perform operations comprising:
  receiving, with a Content Service executing in a cloud-computing-based Cloud Platform, enterprise threat detection (ETD) Content transmitted from an ETD Content Development System (CDS) as a publication of the ETD Content from the ETD CDS, the ETD Content comprising Security Notes and Content Files that are assigned to the Security Notes and comprise an ETD Pattern;
  securely storing, using the Content Service, the received ETD Content into a Content Management System (CMS) interoperably coupled to the Content Service using a secure administrative application programming interface (API) and a non-credential-requiring public API;
  determining, using the Content Service, a registered Client ETD System for which the ETD Content is relevant;
  retrieving the ETD Content from the CMS using the non-credential-requiring public API;
  publishing, using the Content Service, the ETD Content to the registered Client ETD System; and
  detecting, using the ETD Pattern, malicious activities in the registered Client ETD System until the registered Client ETD System is updated to address security weaknesses associated with the malicious activities.

9. The non-transitory, computer-readable medium of claim 8, wherein the ETD Pattern is automatically integrated in the registered Client ETD System to perform automatic, proactive virtual patching.

10. The non-transitory, computer-readable medium of claim 8, further comprising one or more instructions to receive, with the Content Service, the ETD Content using the secure API.

11. The non-transitory, computer-readable medium of claim 8, wherein storing the received ETD Content includes reformatting the ETD Content for storage into the CMS.

12. The non-transitory, computer-readable medium of claim 8, further comprising one or more instructions to receive a registration for ETD Content from an ETD Client Import Service (CIS) executing on the Client ETD System, wherein the ETD CIS is an extension of a Client ETD System database.

13. The non-transitory, computer-readable medium of claim 12, wherein the ETD CIS connects to the Content Service using a public API.

14. The non-transitory, computer-readable medium of claim 8, further comprising one or more instructions to integrate the received ETD Content into the Client ETD System.

15. A computer-implemented system, comprising:
  a computer memory; and
  a hardware processor interoperably coupled with the computer memory and configured to perform operations comprising:
    receiving, with a Content Service executing in a cloud-computing-based Cloud Platform, enterprise threat detection (ETD) Content transmitted from an ETD Content Development System (CDS) as a publication of the ETD Content from the ETD CDS, the ETD Content comprising Security Notes and Content Files that are assigned to the Security Notes and comprise an ETD Pattern;
    securely storing, using the Content Service, the received ETD Content into a Content Management System (CMS) interoperably coupled to the Content Service using a secure administrative application programming interface (API) and a non-credential-requiring public API;
    determining, using the Content Service, a registered Client ETD System for which the ETD Content is relevant;
    retrieving the ETD Content from the CMS using the non-credential-requiring public API;
    publishing, using the Content Service, the ETD Content to the registered Client ETD System; and
    detecting, using the ETD Pattern, malicious activities in the registered Client ETD System until the registered Client ETD System is updated to address security weaknesses associated with the malicious activities.

16. The computer-implemented system of claim 15, wherein the ETD Pattern is automatically integrated in the registered Client ETD System to perform automatic, proactive virtual patching.

17. The computer-implemented system of claim 15, further configured to receive, with the Content Service, the ETD Content using the secure API.

18. The computer-implemented system of claim 15, wherein storing the received ETD Content includes reformatting the ETD Content for storage into the CMS.

19. The computer-implemented system of claim 15, further configured to receive a registration for ETD Content from an ETD Client Import Service (CIS) executing on the Client ETD System, wherein the ETD CIS is an extension of a Client ETD System database, and wherein the ETD CIS connects to the Content Service using a public API.

20. The computer-implemented system of claim 15, further configured to integrate the received ETD Content into the Client ETD System.

* * * * *